United States Patent [19]

Yasuda et al.

[11] Patent Number: 5,203,008

[45] Date of Patent: Apr. 13, 1993

[54] METHOD OF ASSIGNING RADIO COMMUNICATION CHANNELS TO EACH OF A PLURALITY OF MOBILE STATIONS

[75] Inventors: Syuji Yasuda; Yoshiaki Nakajima; Jun Tajima, all of Yokohama, Japan

[73] Assignee: Nippon Telegraph & Telephone Corporation, Tokyo, Japan

[21] Appl. No.: 618,456

[22] Filed: Nov. 27, 1990

[30] Foreign Application Priority Data

Nov. 28, 1989 [JP] Japan .................................. 1-306417

[51] Int. Cl.⁵ ........................ H04B 15/00; H04Q 7/02
[52] U.S. Cl. .................................. 455/33.1; 455/54.2; 455/62; 379/63
[58] Field of Search ....................... 455/33.1, 33.2, 34, 455/54.1, 54.2, 56.1, 62, 67.3, 226.1, 226.2, 226.4; 379/59, 60, 63

[56] References Cited

U.S. PATENT DOCUMENTS

| 4,561,114 | 12/1985 | Kozono et al. | 455/226.4 |
|---|---|---|---|
| 4,670,906 | 6/1987 | Thro | 455/33.2 |
| 4,736,453 | 4/1988 | Schloemer | 455/33.2 |
| 4,750,198 | 6/1988 | Harper | 455/33.1 |
| 5,038,399 | 8/1991 | Bruckert | 455/62 |

FOREIGN PATENT DOCUMENTS

2-141036 5/1990 Japan .
2208985A 4/1989 United Kingdom .................. 455/62

Primary Examiner—Reinhard J. Eisenzopf
Assistant Examiner—Lisa Charouel
Attorney, Agent, or Firm—Frishauf, Holtz, Goodman & Woodward

[57] ABSTRACT

In a method of assigning a mobile radio communication channel, a plurality of mobile stations and a plurality of base stations constituting communication zones are distributed in a service area. The mobile stations are connected to the base stations for communication. A radio communication channel which meets the following first and second conditions is selected and assigned. The first condition is that a reception electric field level of communication between the mobile station and the base station which are connected for communication belongs to a channel group which satisfies a lower limit value. The second condition is that when the radio communication channel is used for communication connection, the ratio (D/U) of desired wave power to interference wave power satisfies quality conditions.

2 Claims, 7 Drawing Sheets

DESIRED D/U : NEARLY 7 ZONE REUSE

NUMBER OF CHANNELS : 21×3 (3ch TDMA)

ZONE NUMBER : 61 (ORTHO-HEXAGONAL ZONE ARRANGEMENT)

F I G. 7B

DYNAMIC CHANNEL ASSIGNMENT
7 GROUP DIVISION (3×3ch/GROUP)

F I G. 7C

METHOD OF ASSIGNING RADIO COMMUNICATION CHANNELS TO EACH OF A PLURALITY OF MOBILE STATIONS

BACKGROUND OF THE INVENTION

1. Field of the Invention

The present invention relates to a method of assigning radio communication channels to each of a plurality of mobile stations, in which method a dispersed control system is employed in a dynamic channel assignment system.

2. Description of the Related Art

In a mobile radio system, conventional channel assignment methods include a fixed channel assignment method, in which the assignment of all channels to radio zones is unchanged on a time basis, and a dynamic channel assignment method, in which channels to be assigned are changed on a time basis while the buffer zone is monitored by a central processing unit.

According to the fixed channel assignment method, the following problem occurs: when a new call is generated in a radio zone where a mobile station is busy, only one channel is available; thus the new call is rendered ineffective.

On the other hand, according to the dynamic channel assignment method, for example, when a new call is generated in a radio zone where a mobile station is busy, a channel, which is not used in a buffer zone for the radio zone, can be assigned to the mobile station, thereby preventing the occurrence of an ineffective call and realizing flexible re-use of frequencies.

The dynamic channel assignment method is disclosed, for example, in Published Unexamined Japanese Patent Application No. 2-141036. According to the method disclosed in this document, a control station for controlling base stations collects detailed information relating to the channels used by peripheral base stations. On the basis of the collected information, the channels are checked to select an optimal channel, thus realizing effective use of frequencies. This system is called a dynamic central control system. In this prior art, however, additional control operations are required for assigning channels and to be transmitted among stations. This results in an increase in the system cost and in a delay of connection operation between the mobile station and the base station. These are significant drawbacks in a mobile radio system wherein effective use of frequencies is important.

SUMMARY OF THE INVENTION

The object of the present invention is to provide a method of assigning radio communication channels to a plurality of mobile stations, which method employs a dispersed control system wherein drawbacks in a dynamic central control system are eliminated, the increase in the amount of control operations can be prevented, there is no need to transfer information for channel assignment control, and spatial frequency use efficiency can be enhanced.

In order to achieve the above object, there is provided a method of assigning mobile radio communication channels to each of a plurality of mobile stations and each of a plurality of base stations arranged in a service area, said base stations constituting a radio zone where the base stations are connected to the mobile stations for communication, wherein each of said base stations includes a plurality of radio communication channels used for communication between the base station and the mobile station, said radio communication channels being divided into a plurality of channel groups, each channel group having a predetermined lower limit value of a reception electric field level of a received signal, which lower limit value is necessary for communication between the mobile station and the base station, and a radio control channel used for transmission of control information at the time other than the communication time, said method comprising:

a first step of determining whether or not a reception electric field level for communication, which is found from a reception electric field level of a reception signal of said radio control channel between the mobile station issuing a communication connection demand and the base station within the radio zone, belongs to a channel group which meets a predetermined lower limit value of the reception electric field level, thereby finding a radio communication channel to be assigned in response to the communication connection demand issued within the radio zone;

a second step of determining whether or not said radio communication channel belongs to the channel group which meets the lower limit value of the reception electric field level for communication, and satisfies a threshold of the ratio of desired wave power to interference wave power (D/U) when the communication connection demand is generated; and a third step of assigning the radio communication channel determined and selected in said first and second steps to the mobile station and the base station, the communication connection between which is requested.

According to this method, channel assignment control for enhancing spatial frequency use efficiency is carried out in a dispersed manner, so that the channel assignment is made in the base stations in the respective radio zones. Thus, unlike the prior art, the present invention does not use a large-scale control apparatus for performing centralized control, or a control circuit for collecting a great deal of information. Therefore, an inexpensive mobile communication system with a large capacity can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will now be described with reference to the accompanying drawings.

Figure 1:
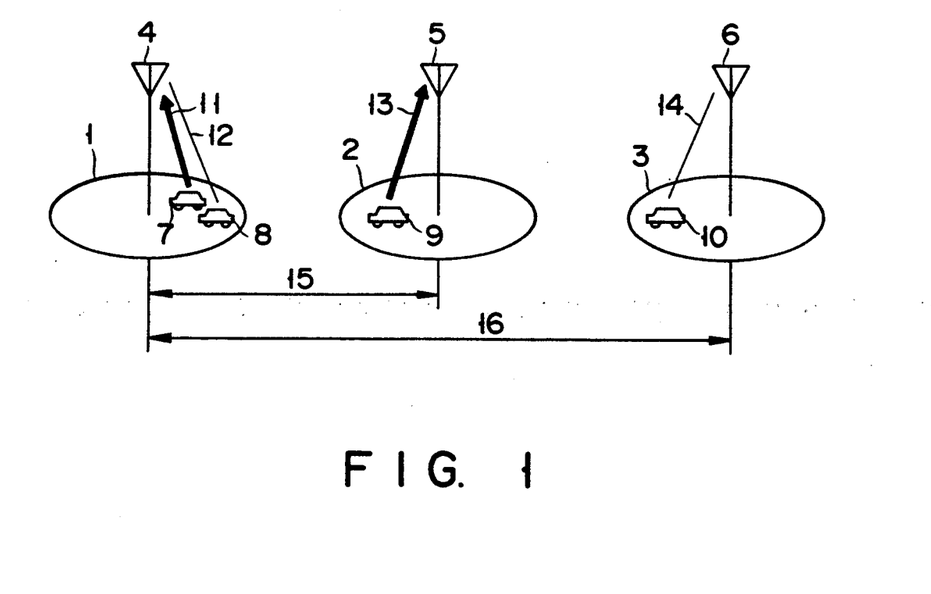
FIG. 1 is a schematic view of a mobile radio system according to the present invention, wherein the same frequency is repeatedly used.

FIG. 1 illustrates the mode in which the same frequency is repeatedly used in a mobile radio system. For the purpose of simplicity, FIG. 1 shows only three radio zones and two frequencies to be repeatedly used. In fact, a service area is fully occupied by radio zones, and more frequencies are repeatedly used. In FIG. 1, reference numerals 1, 2 and 3 denote radio zones; 4, 5 and 6 radio base stations; 7 to 10 mobile stations; and 11 to 14 communication connections between the base stations and the corresponding mobile stations. The communication connections 11 and 13 are indicated by thicker lines than the communication connections 12 and 14, since the communication connections 11 and 13 have higher electric field levels of received signals because of better communication conditions.

The same frequencies may be used repeatedly for the communication connections 11 and 13 and the communication connections 12 and 14, respectively. Regarding the communication connections 11 and 13 under better communication conditions, a high electric field level of a desired received wave can be obtained, and therefore the connections 11 and 13 can withstand a high interference wave reception electric field level. A desirable ratio of a desired wave power to interference wave power (hereinafter, called D/U) is obtained with a repetition use interval 15. On the other hand, regarding the communication connections 12 and 14 under undesirable communication conditions, in order to obtain a desirable D/U, it is necessary to lower the interference wave reception electric field level. Thus, the frequency can be repeated at the distance 16. In other words, unless the distance is made greater, the channel is influenced by the interference wave reception electric field level. Regarding the communication connection of good quality, the frequency can be repeatedly used at less intervals, that is, such communication connection can withstand the influence of the interference wave reception electric field level. Thus, taking into account the desired wave reception electric field level and the interference wave reception electric field level, a channel of a minimum use interval can be selected at the time of assigning channels, thereby enhancing the use efficiency of frequencies.

The principle of the present invention, whereby the channel assignment control capable of enhancing the frequency use efficiency can be combined with the distributed control at base stations, will now be described.

In the channel assignment, in order to use one frequency repeatedly, it is imperative that no interference occurs at all locations where there is a possibility of interference. This will now be explained, with reference to FIG. 2 which illustrates the repeated use of a frequency between two communication points. Reference numerals 17 and 18 denote radio zones; 19 and 20 radio base stations; 21 and 22 mobile stations; 23 and 24 communication connections; 25 and 26 incoming interference waves; and 27 to 30 regions of interference. For example, when a new channel is assigned to the communication connection 23 between the base station 19 of radio zone 17 and the mobile station 21, it is necessary to confirm that a desired D/U is satisfied at all regions 27 to 30. Accordingly, it is necessary to consider not only the zone 17 where the channel is assigned, but also peripheral the zone 18 where the same channel is used. Under the situation, in the prior art, there are proposed a so-called central control system, wherein a control station for controlling base stations collects all information relating to the peripheral zone, and a system wherein information is transferred to the zone 17 to select a channel to be assigned.

The present invention employs a dispersed system wherein a channel is assigned on the basis only of information obtained in the zone where the channel is to be assigned. This invention is characterized in that reception electric field level conditions for using channels are determined in advance to obtain an estimate of the quality of the communication using the channels. Thus, if it is confirmed that the reception electric field levels of the communications using the same channel within a system are equal to each other and that a predetermined D/U is satisfied in the zone where the channel is assigned (since the interference of one communication is closely related with that of another), the satisfactory quality of the communication using the same channel in the peripheral zone is ensured with a fair probability.

The above system will now be described in greater detail with use of FIG. 2, by referring to (i) the case where transmission power control is not performed, (ii) the case where transmission power control is performed, and (iii) the case where power transmission control is performed only in an up-link direction.

The transmission power control includes an up-link power control and a down-link power control. In the up-link power control, a signal is transmitted from a mobile station to a base station to equalize the reception electric field levels of both station. In the down-link control, a signal is transmitted from the base station to the mobile station to reduce the power consumption of the mobile station.

Figure 2:
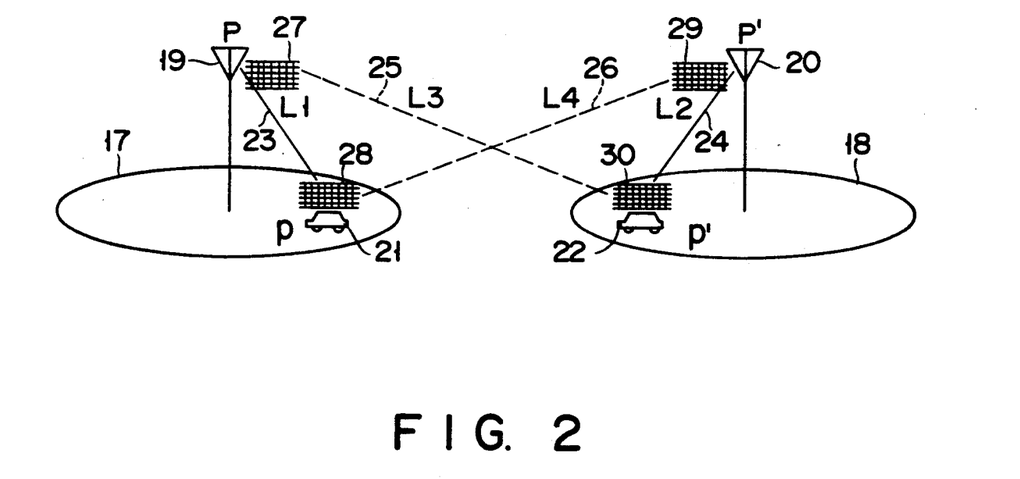
FIG. 2 is a view for explaining a mobile radio system according to an embodiment of the invention, wherein frequencies are repeatedly used between two radio zones.

In FIG. 2, P and P' denote real transmission outputs [dB] of base stations 19 and 20, and p and p' denote real transmission outputs [dB] of mobile stations 21 and 22. The reception electric field level is found from a difference between the real transmission outputs and propagation losses L1 to L4. And the D/U is found from a difference between the desired wave electric field level and the interference wave electric field level.

The D/U 1 to D/U 4 at the interference occurrence regions 27 to 30 are obtained by the following equations:

Interference Region 27: $D/U1 = (p - L1) - (p' - L3)$

Interference Region 28: $D/U2 = (P - L1) - (P' - L4)$

Interference Region 29: $D/U3 = (p'-L2)-(p-L4)$

Interference Region 30: $D/U4 = (P'-L2)-(P-L3)$

As stated above, in the present invention, the same frequency is used under the same communication conditions. Thus, the relationship, $L1 \approx L2$, is established.

i) Case where transmission power control is not performed:

From $P \approx P'$ and $p \approx p'$, $D/U1 \approx L3 - L1 \approx D/U4$ $D/U2 \approx L4 - L1 \approx D/U3$ $D/U3 \approx L4 - L2 \approx D/U2$ $D/U4 \approx L3 - L2 \approx D/U1$ Therefore, the D/U of interference region 27 is equal to that of interference region 30, and the D/U of interference region 28 is equal to that of interference region 29.

ii) Case where transmission power control is performed:

Since the transmission power control is performed so as to make the reception level constant, it is found that from $P - L1 \approx P' - L2$ and $p - L1 \approx p' - L2$, $D/U1 \approx L3 - L2 \approx D/U4$ $D/U2 \approx L4 - L2 \approx D/U3$ $D/U3 \approx L4 - L1 \approx D/U2$ $D/U4 \approx L3 - L1 \approx D/U1$ Therefore, the D/U of interference region 27 is equal to that of interference region 30, and the D/U of interference region 28 is equal to that of interference region 29.

iii) Case where power transmission control is performed only in the up-link direction:

from $P \approx P'$ and $p - L1 \approx p' - L2$, $D/U1 \approx L3 - L2 \approx D/U4$ $D/U2 \approx L4 - L1 \approx D/U3$ $D/U3 \approx L4 - L1 \approx D/U2$ $D/U4 \approx L3 - L2 \approx D/U1$ Therefore, the D/U of interference region 27 is equal to that of interference region 30, and the D/U of interference region 28 is equal to that of interference region 29.

In each case, the D/U of the zone 18 is equal to that of the zone 17. Thus, when it is confirmed that a predetermined D/U is met in the zone 17, the quality of an assigned channel is ensured in other zones, too.

In the above embodiment, since the simple model with two communications is employed under simplified conditions, the D/Us of the two communications are substantially equal. By contrast, an actual system is not necessarily operated under ideal conditions, and therefore the D/Us are not always equal. However, where the channel is used under the same conditions in the respective communications, the D/Us have high correlation. If a given margin is provided in the desired D/U and an assigned channel is selected, it becomes possible to meet predetermined conditions in the peripheral zone with a sufficiently high possibility.

Figure 3:
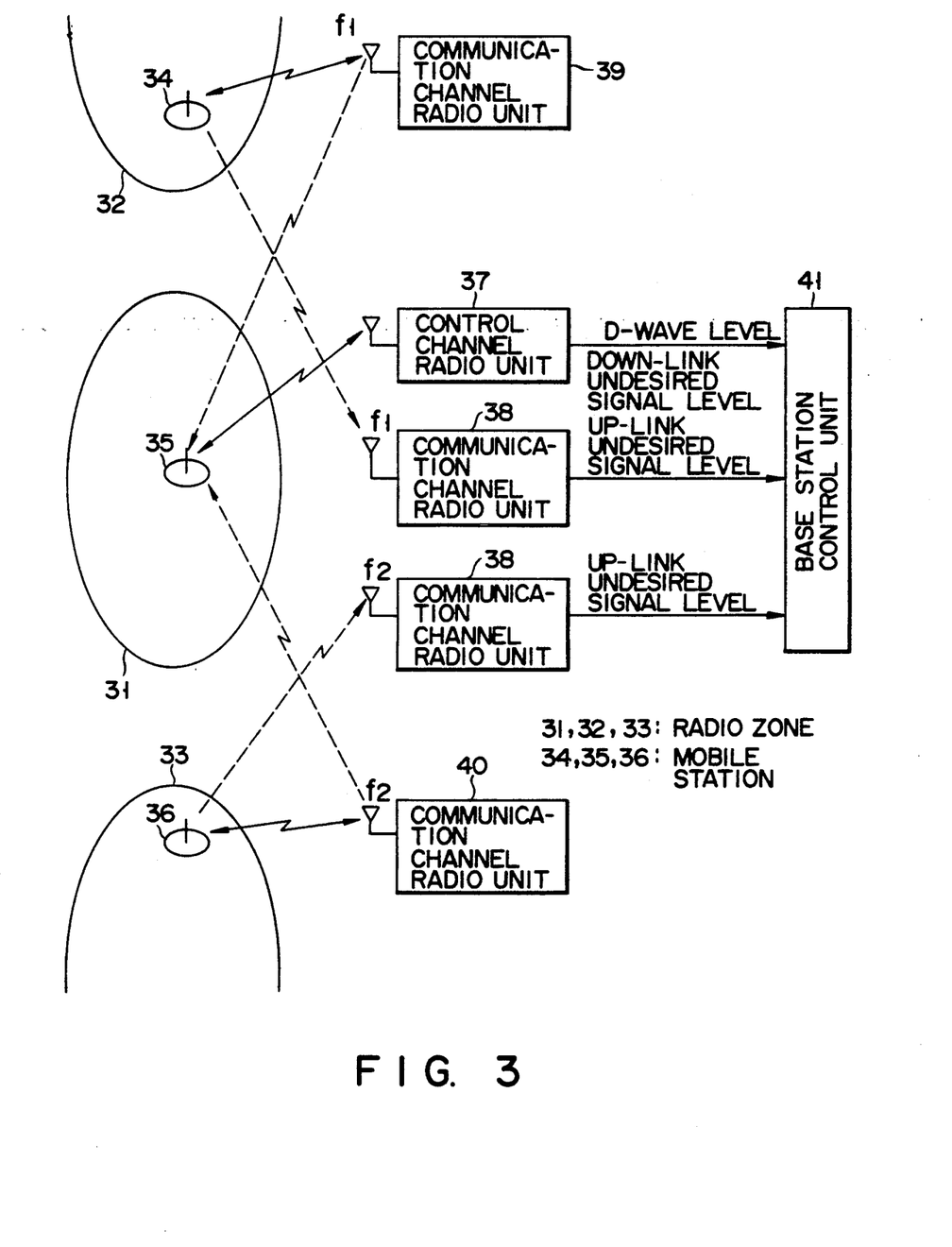
FIG. 3 shows an example of the structure of a system for working a method of this invention of assigning radio channels.

FIG. 3 shows an example of the structure of a system for working a method of assigning radio channels, according to an embodiment of the present invention. In FIG. 3, reference numerals 31, 32 and 33 denote radio zones; 34, 35 and 36 mobile stations; 37 a control radio unit of a base station; 38, 39 and 40 communication radio units of the base station; and 41 a base station control unit. All radio communication channels are divided into a plurality of channel groups. Each channel group has an assigned lower limit value of a reception electric field level necessary for communication. If a reception level is the lower limit value or higher, communication is allowed with the channels of the group. Prior to communication connection, control information is transmitted between the base station and the mobile station via a radio communication channel, which channel is selected and assigned by the control unit.

Figure 4A:
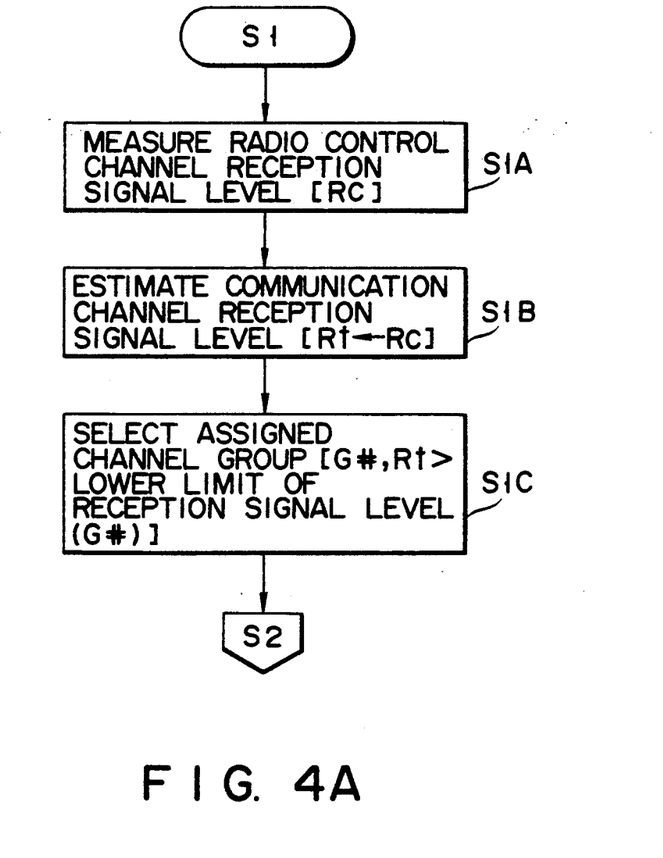
FIGS. 4A to 4C are flowcharts for illustrating the steps of a method of assigning radio channels according to an embodiment of the invention.
Figure 4B:
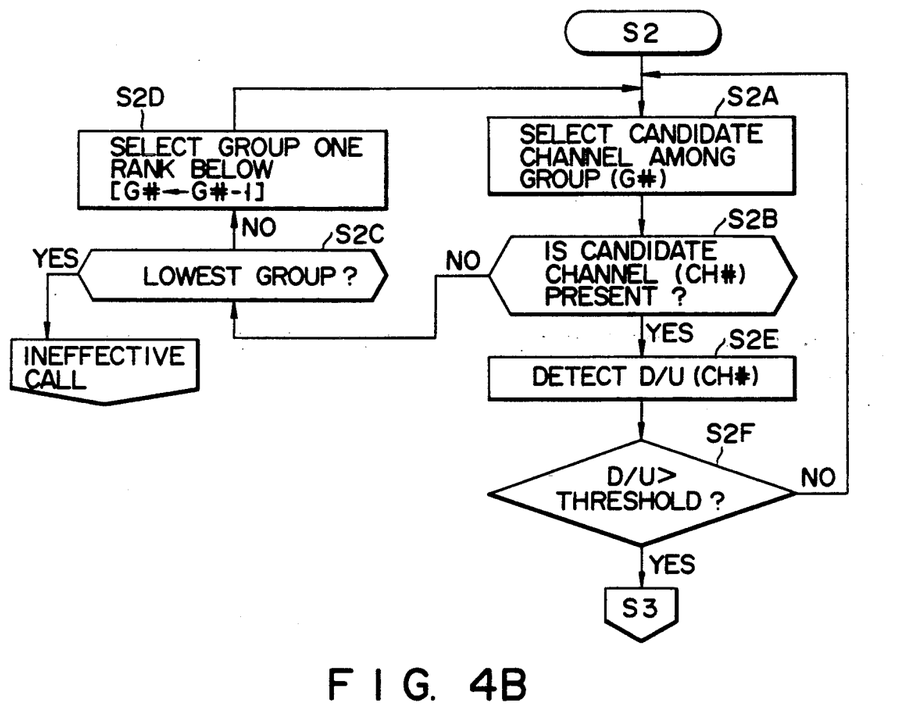
Figure 4C:
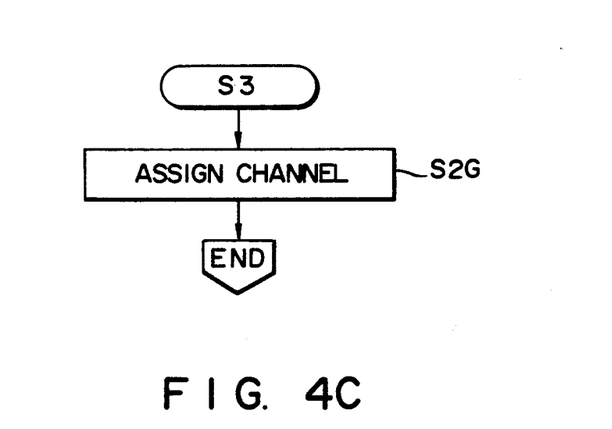

In the above-described system of this invention, the radio communication channel is assigned according to the steps shown in FIGS. 4A to 4C. That is, the channel assignment is carried out through the process including the steps of FIG. 4A of determining whether or not a communication reception electric field level belongs to a channel group capable of meeting the lower limit value of a predetermined reception electric field level; the steps of FIG. 4B of determining whether or not the D/U of the present radio communication channel satisfies a predetermined threshold; and the steps of FIG. 4C of assigning the radio communication channel selected by the above steps as a channel between the mobile station, which demands communication connection, and the base station.

The steps of FIGS. 4A to 4C will now be described in detail.

In FIG. 4A, when a communication connection demand is generated between a mobile station and a base station in a standby mode (S1), a radio control channel reception electric field level Rc of a control signal from the mobile station is measured by the control radio unit (S1A). A desired wave reception electric field level Rt for communication between the mobile station and the base station is estimated on the basis of the radio reception electric field level Rc of the radio control channel (S1B). The control unit receives the reception electric field level Rt and selects the channel group having the lowest one of the lower limit values which meet the condition (S1C).

In FIG. 4B, one or more candidate channels, which meet a predetermined D/U, are searched from among the previously selected channel group (S2A), and the presence/absence of such candidate channels is determined (S2B). When it is found as a result of the search that there is no candidate channel, it is determined whether there is a candidate channel in the lowest rank group (S2C). If the group includes no channel which satisfies the threshold, a channel group one rank below is selected (S2D). Once again, a candidate channel is selected from among this group. If the assignment candidate channel is selected, the D/U value is detected on the basis of the reception electric field level (D-wave level) and the interference wave reception electric field level (U-wave level) (S2E). It is then determined whether or not the D/U value meets a predetermined threshold (S2F). The radio communication channel, which has been determined to meet the threshold, is assigned as a channel between the mobile station and the base station, as shown in FIG. 4C (S2G).

Figure 5:
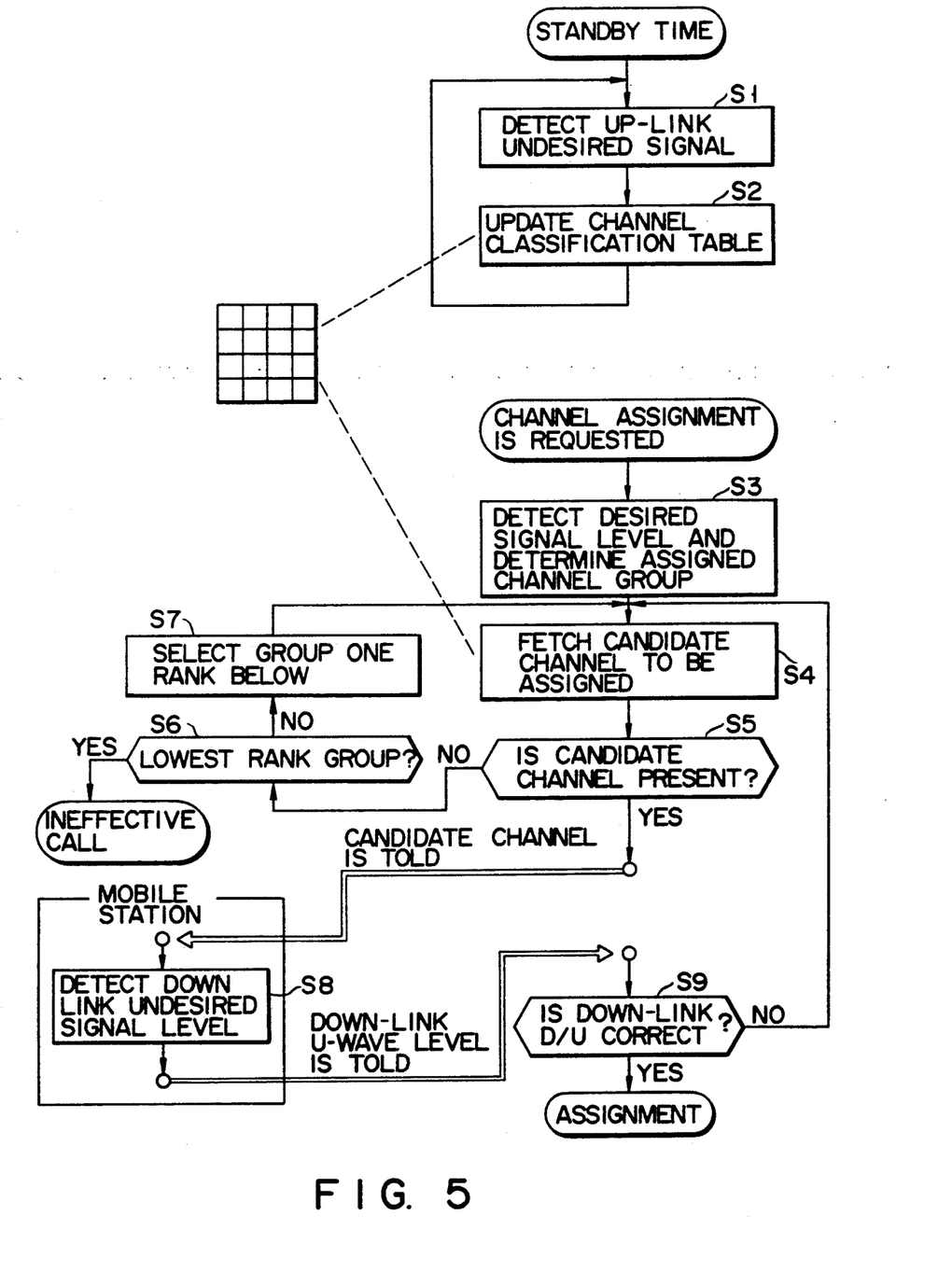
FIG. 5 is a flowchart for illustrating the steps of a method of assigning radio channels according to another embodiment of the invention.

Next, another embodiment of the invention, wherein the assignment channel group is selected according to a channel classification table, will now be described with reference to FIGS. 5 and 6. The flowchart of FIG. 5 corresponds to the system structure shown in FIG. 3.

At the standby time, in the base station, a channel which is assigned to the system and is not used is set in a non-busy communication radio unit 38. The radio unit 38 detects a reception electric field level (S1) and tells the detected level to the control unit 41. This electric field level corresponds to the ascending interference wave reception electric field level ("U"=level) from the mobile station 34 (36) in the peripheral radio zone 32 (33) where the same channel is used. In accordance with this level, the control unit 41 classifies the channels (S2). FIG. 6 shows an example of a classification table. In FIG. 6, the ordinate indicates channel groups, and the abscissa indicates an ascending interference wave reception electric field level. Symbols #1 to #5 denote group numbers, l1 to l5 denote lower limit values of reception electric field levels of channels of the respective groups, and thick lines denote thresholds of interference wave reception electric field levels which satisfy a predetermined D/U with respect to channel groups #1, #3 and #4. The thresholds differ among the channel groups. Regarding the channel group #3, channels f1 and f2 meet predetermined D/U but channel f3 fails to meet the D/U.

When a communication connection demand is generated between the mobile station 35 and the base station, a desired wave reception electric field level for communication between the mobile station 35 and the base station is estimated on the basis of a reception electric field level (i.e D-wave level) in the control radio unit 37 corresponding to a control channel of a control signal delivered from the mobile station 35, and the estimated level is told to the control unit 41.

Figure 6:
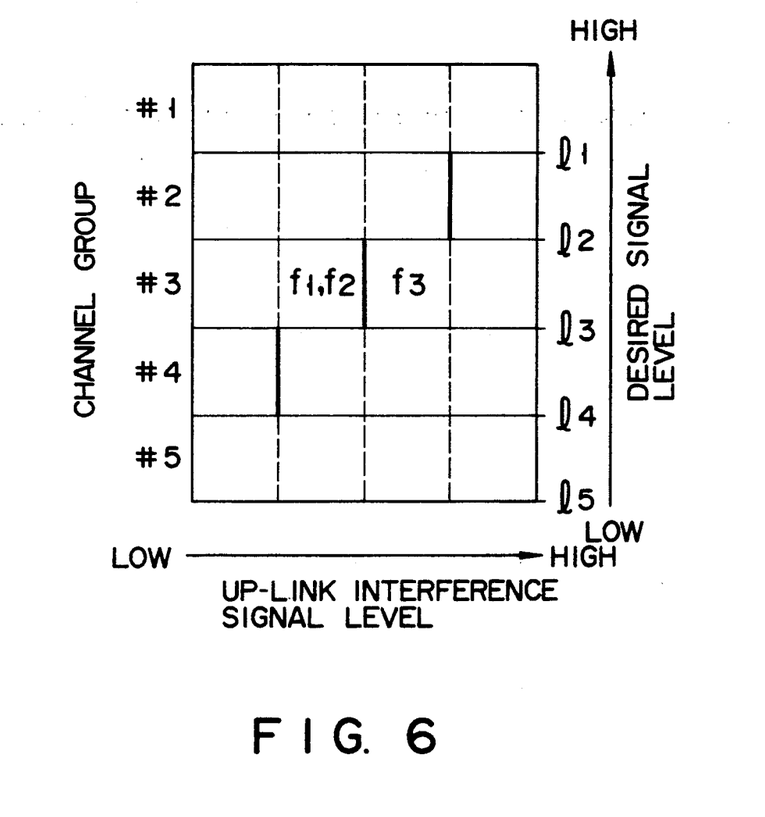
FIG. 6 shows an example of channel classification table used in the embodiment shown in FIG. 5.

The control unit 41 refers to the channel classification table of FIG. 6, on the basis of the reception electric field level. The control unit 41 selects a channel group having a lowest lower limit value of the satisfactory lower limits, as a group from which a channel is selected (S3). In other words, a channel group having a least allowance of the reception electric field level is selected. One or more of the channels within the group, which meets the threshold of the predetermined D/U, are selected as candidate channels to be assigned (S4, S5 and S6). If there is no channel which meets the threshold, a candidate channel is selected from a channel group one rank below, which has a little allowance of the reception electric field level (S7). The selected candidate channel to be assigned is told to the mobile station 35 via a radio control channel. The mobile station 35 once changes the radio control channel to the selected candidate channel, and the reception electric field level is detected. Since this channel is not used by the mobile station, the reception electric field level corresponds to the interference wave reception electric field level (i.e. U-wave level) of the interference wave from the communication radio units 39 and 40 of the base stations in the peripheral zones 32 and 33 where the same channel is used. Similarly, this interference wave reception electric field level is told to the base station via the radio control channel. The control unit 41 confirms whether the down-link D/U is met (S8). Finally, one channel is selected and assigned (S9).

In the above embodiment, various algorisms are performed in the process of finding the candidate channels on the basis of the channel classification table, and in the process of confirming the down-link D/U in the mobile station and selecting the channel to be assigned. For example, it is possible to select predetermined conditions from ones with a small allowance or from ones with a large allowance, to determine the number of candidate channels, and to determine whether re-selection should be done. In this invention, various choices are possible.

The above-described embodiments are only examples for describing the invention. The subject matter of the invention is not limited to the above embodiment. This invention is applicable to other D/U detection methods. Even if both the up-link and down-link D/Us are not confirmed, if either one is confirmed, this invention can be realized, though the frequency use efficiency is lowered. In this case, an appropriate margin is added to a predetermined D/U to compensate the quality of the other D/U.

As has been described above, this invention is applicable when the transmission power control is performed. In this case, the transmission power is controlled so that the reception electric field level takes its lower limit value in each channel group.

Figure 7A:
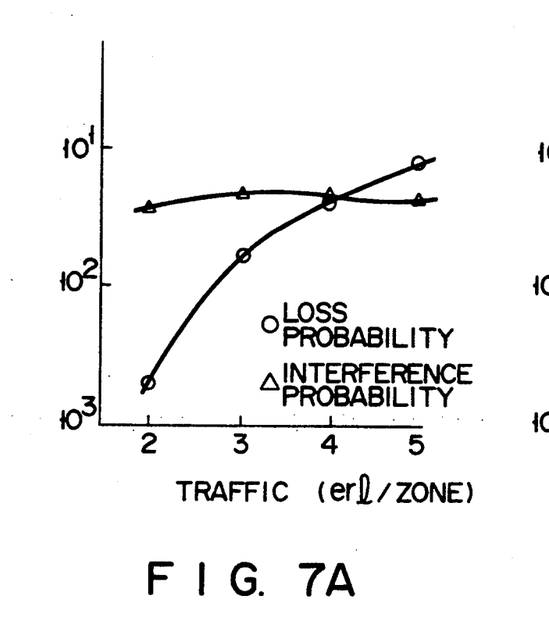
FIGS. 7A to 7C show simulated effects of the embodiments of the invention, as compared to the prior art.
Figure 7B:
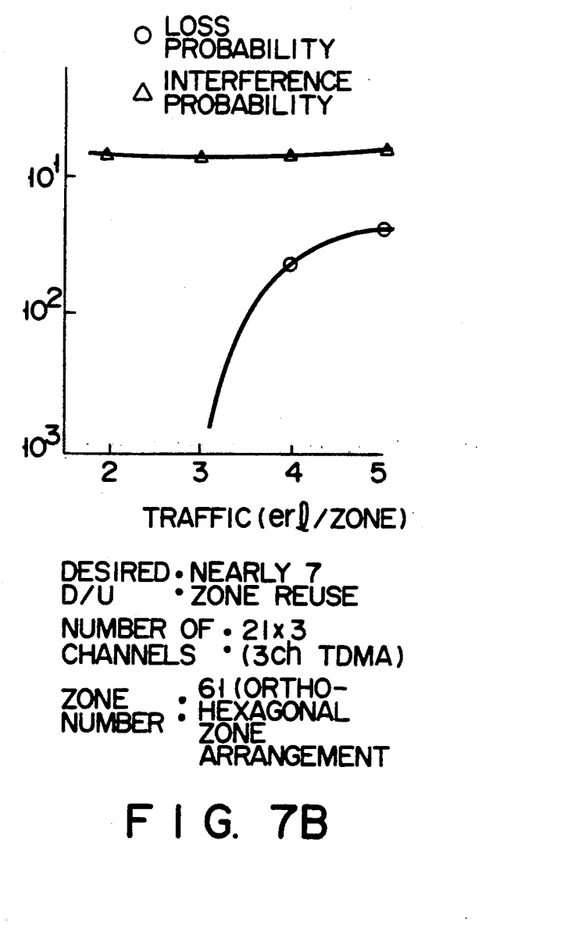
Figure 7C:
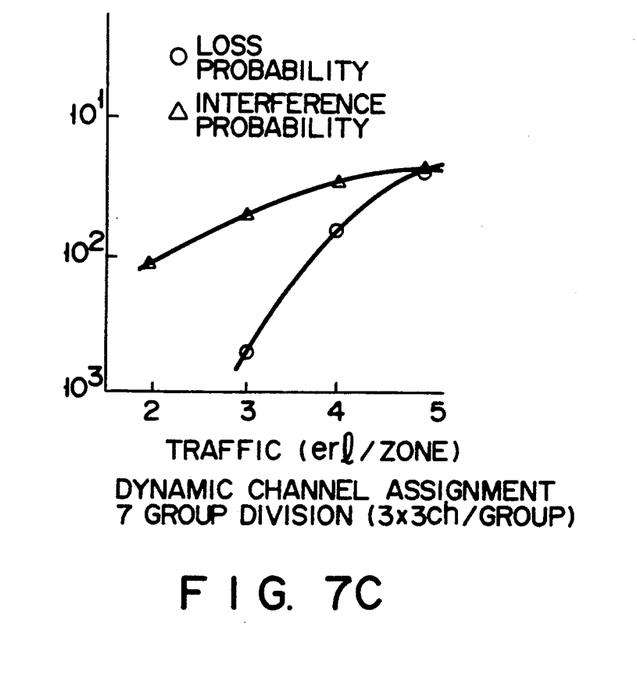

FIGS. 7A to 7C show simulated effects of the embodiments of the invention. FIG. 7A shows an ineffective call rate and a peripheral interference rate in the case where a conventional fixed channel arrangement is employed. FIG. 7B shows the same in the case where a conventional dynamic channel arrangement is employed, and FIG. 7C shows the same in the case of the present invention. In FIGS. 7B and 7C, dynamic channel assignment is carried out with respect to all channels assigned to the system. In FIG. 7B, though the interference rate is increased, the interference rate is lowered by the techniques of the embodiments. In addition, the ineffective call rate lowers, compared to the conventional fixed channel arrangement.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of assigning mobile radio communication channels to a plurality of mobile stations and a plurality of base stations arranged in a service area, said base stations constituting a radio zone where the base stations are connected to the mobile stations for communication, wherein each of said base stations includes a plurality of radio communication channels used for communication between the base station and the mobile station, said radio communication channels being divided into a plurality of channel groups, each channel group having a predetermined lower limit value of a reception electric field level of a reception signal, the predetermined lower limit value being necessary for communication between the mobile station and the base station, and a radio control channel used for transmission of control information before the communication time, said method comprising:

a first step of determining whether or not the reception electric field level of the reception signal for communication, which is found from the reception electric field level of the reception signal of said radio control channel between the mobile station issuing a communication connection demand and the base station within the radio zone, belongs to one of the channel groups which meets the predetermined lower limit value of the reception electric field level of the reception signal, thereby finding a radio communication channel to be assigned in response to the communication connection demand issued within the radio zone;

a second step of determining whether or not said radio communication channel belongs to the channel group which meets the predetermined lower limit value of the reception electric field level of the reception signal for communication, and satisfies a threshold of the ratio of desired wave power to interference wave power (D/U) when the communication connection demand is generated; and a third step of assigning the radio communication channel determined and selected in said first and second steps to the mobile station and the base station, the communication connection between which is requested.

2. The method according to claim 1, wherein said ratio of desired wave power to interference wave power (D/U) is obtained on the basis of a difference between a desired wave reception electric field level and an interference wave reception electric field level, said desired wave reception electric field level being estimated from the reception electric field level of the radio control channel, and said interference wave reception electric field level being obtained from the reception electric field level of the radio communication channel measured in a non-used state.

* * * * *